United States Patent
Li et al.

(10) Patent No.: US 12,437,356 B2
(45) Date of Patent: *Oct. 7, 2025

(54) DYNAMICALLY REDUCING LATENCY IN PROCESSING PIPELINES

(71) Applicant: NVIDIA Corporation, Santa Clara, CA (US)

(72) Inventors: Sau Yan Keith Li, San Jose, CA (US); Seth Schneider, San Jose, CA (US); Cody Robson, Portland, OR (US); Lars Nordskog, Corte Madera, CA (US); Charles Hansen, San Francisco, CA (US); Rouslan Dimitrov, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,099

(22) Filed: Mar. 4, 2024

(65) Prior Publication Data

US 2024/0202860 A1 Jun. 20, 2024

Related U.S. Application Data

(63) Continuation of application No. 17/448,258, filed on Sep. 21, 2021, now Pat. No. 11,922,533.

(51) Int. Cl.
*G06T 1/20* (2006.01)
*G06F 9/38* (2018.01)
*G06F 9/48* (2006.01)

(52) U.S. Cl.
CPC .............. *G06T 1/20* (2013.01); *G06F 9/3836* (2013.01); *G06F 9/4881* (2013.01)

(58) Field of Classification Search
None
See application file for complete search history.

(56) References Cited

U.S. PATENT DOCUMENTS

| | | |
|---|---|---|
| 2013/0111497 A1 | 5/2013 | Chen et al. |
| 2018/0081353 A1 | 3/2018 | Enke |
| 2019/0362005 A1 | 11/2019 | Sen et al. |

*Primary Examiner* — Joni Hsu
(74) *Attorney, Agent, or Firm* — Lowenstein Sandler LLP

(57) ABSTRACT

A weighted average execution time associated with each execution stage of a plurality of execution stages used to process a plurality of frames in parallel is obtained. The processing of each of the plurality of frames is performed at each of the plurality of execution stages in a sequential order, starting with an initial execution stage and continuing with each subsequent execution stage. A first largest weighted average execution time associated with one of the plurality of execution stages is determined. A delay to the initial execution stage prior to processing a first next frame is applied. The delay is determined based on the first largest weighted average execution time.

20 Claims, 7 Drawing Sheets

DYNAMICALLY REDUCING LATENCY IN PROCESSING PIPELINES

RELATED APPLICATIONS

This application is a continuation of U.S. patent application Ser. No. 17/448,258, filed on Sep. 21, 2021, now U.S. Pat. No. 11,922,533, the entire contents of which are hereby incorporated by reference herein.

TECHNICAL FIELD

At least one embodiment pertains solutions for dynamically reducing latency for processing pipelines, such as, gaming, simulation, and rendering pipelines. For example, at least one embodiment pertains to applying execution delays to an initial stage of a processing pipeline to eliminate queues caused by backpressure resulting from a subsequent bottleneck stage according to various novel techniques described herein.

BACKGROUND

Typically, gaming and other software pipelines that include content generation have a series of stages used to process a plurality of frames of a game or application. Each frame should be processed in each stage of the series of stages in order for the frame to be displayed. In some instances, the series of stages include a simulation thread stage, a render commands generation stage, and a GPU render stage. Accordingly, each frame is simulated at the simulation thread stage, rendered on the CPU and submitted to the GPU via the render commands generation stage, and the GPU renders the frame and displays the frame via the GPU render stage.

DETAILED DESCRIPTION

Figure 1:
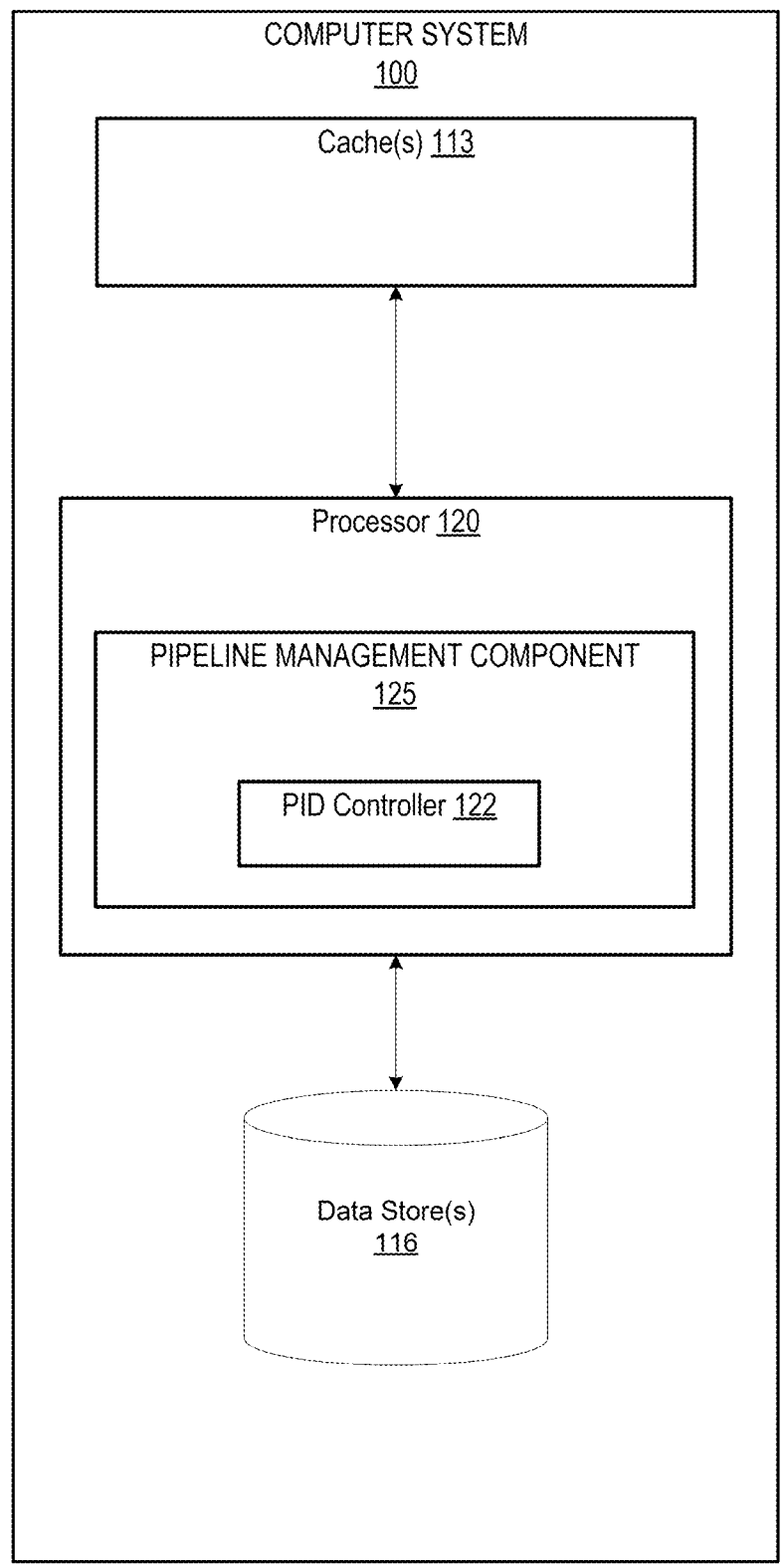
FIG. 1 illustrates an example computing system for dynamically reducing latency in processing pipelines, in accordance with at least one embodiment.

Typically, games and other applications are processed through processing pipelines that include various stages, such as a simulation thread stage, a render commands generation stage, and a GPU render stage. A typical processing pipeline might permit processing of a frame in each stage in parallel on different CPU cores and GPU cores but each frame should be processed sequentially from the first stage (e.g., simulation thread stage) through to the last stage (e.g., GPU render stage) thereby requiring processing of each frame to be completed in the previous stage (e.g., render commands generation stage) prior to moving on to the subsequent stage (e.g., GPU render stage). For example, while a GPU core is rendering frame Y, one CPU core can render/submit frame Y+1 to the GPU core to be rendered after completion of frame Y. Typically, the GPU render stage takes the longest time to complete, resulting in a bottleneck at the GPU render stage and causing backpressure on the render commands generation stage and the simulation thread stage. In some instances, the various stages are connected via buffers, thereby causing further backpressure in the buffer causing additional latency. This backpressure can cause queues and/or stalls between the simulation thread stage and the render commands generation stage, and between the render commands generation stage and the GPU render stage, thereby increasing latency (the time period) of the frame throughout the processing pipeline (from the start of the frame processing at the simulation thread stage to the end of the frame processing at the GPU render stage). In some instances, workload at each stage can change (e.g., increase or decrease) and therefore any stage of the pipeline may experience a bottleneck, resulting in backpressure for previous stages of the pipeline.

In order to avoid backpressure, some conventional systems introduce a delay to the render commands generation stage based on a measured average duration of what it took for the GPU render stage to process a frame. However, this can introduce backpressure in the simulation thread stage. An alternative solution to avoiding introducing backpressure would require the user to enable a frames per second (FPS) limiter to limit the FPS lower than the native FPS. This, however, can result in a decreased throughput and in some instances increases latency, and can be tedious and inefficient because it would require the user to manually modify the settings of the FPS cap as the complexity of the scene increases and/or decreases.

Aspects of the present disclosure address the above and other deficiencies by providing techniques and methods for determining which of the stages of the processing pipeline contains the bottleneck and predictively applies a delay (e.g., frame pacing) to the initial stage to avoid the back pressure and reduce latency. In at least one embodiment, a delay is applied to a simulation thread stage rather than a render commands generation stage to avoid a bottleneck at a GPU render stage (i.e., the delay is applied to the processing pipeline prior to the initial stage). Additionally, if the bottleneck happens to occur at the render commands generation stage, rather than the GPU render stage, the delay applied to the initial stage would still result in remedying the stage with the bottleneck. Thus, inputs by the user (e.g., mouse and keyboard) are sampled as late as possible, resulting in reduced end-to-end latency.

In at least one embodiment, the delay is determined by calculating a weighted average execution time for each stage of the pipeline (e.g., by dividing the sum of processing times of frames at a particular stage by the number of frames processed at the particular stage), identifying the largest weighted average execution time, and using a difference between the largest weighted average execution time and an execution time of a previous frame in the first stage as the delay.

In at least one embodiment, a customized proportional-integral-derivative (PID) controller is used to optimize the use of the delay determined (e.g., pacing of the initial stage) as discussed herein. A PID controller can refer to a control loop mechanism that can automatically adjust a control output based on a difference between a set point (a target value) and a measured process variable (measured process value that may deviate from the desired value). Using a longer than needed delay can reduce throughput and using a shorter than needed delay may yield no benefit. The customized PID used by the aspects of the present disclosure can cause the delay to be adjusted to achieve optimal performance (e.g., by targeting the initial queue time of zero) and to reflect changes to workloads and other runtime conditions. For example, when the queue before the bottleneck stage is building up, the PID controller can cause the delay to be increased, and when the queue before the bottleneck stage is draining down, the PID controller can cause the delay to be shortened. If the start of the bottleneck stage is delayed by the previous stage (resulting in a negative queue), the PID controller can also cause the delay to be shortened.

Accordingly, aspects of the present disclosure achieve shortened latency for processing pipelines, are effective regardless of which pipeline stage is a bottleneck, and can reduce queues between all stages of the pipeline. In addition, aspects of the present disclosure have minimal impact on the throughput of pipeline stages and require no manual interaction (e.g., no manual modification of the settings of the FPS, or the like).

It should be noted that processing pipelines used with reference to gaming applications and gaming software are used herein for illustration only. Aspects of the present disclosure can be similarly applied to any other pipelines that process content (e.g., images or videos) and have bottleneck stages causing backpressure to prior stages in the pipeline.

FIG. 1 illustrates a system for hosting and executing pipeline management component 125, according to at least one embodiment. A computer system 100 may be a server, a system on a chip (SoC), a desktop computer, a laptop computer, a mobile computing device, a video game console, a cloud computing environment, and/or any other computer system. In at least one embodiment, computer system 100 may include, without limitation, one or more processors 120 representing one or a plurality of graphical processing units (GPU)s, central processing units (CPU)s, and/or any other processors. Computer system 100 may further include cache(s) 113, data store(s) 116, and/or other components and features not illustrated. Computer system 100 may include a pipeline management component 125, which may be implemented using one or more processors 120, and optionally one or more other components. In embodiments, computer system 100 may be components of a device such as a video game console, a mobile phone, an autonomous vehicle, a non-autonomous vehicle, a video surveillance system, a laptop computer, a desktop computer, a quality analysis (QA) inspection system, or other system.

In at least one embodiment, computer system 100 may include any number of cache(s) 113, including those described herein. For example, in at least one embodiment, cache(s) 113 could include a level three ("L3") cache and/or a level two ("L2") cache that is available to both CPU(s) and GPU(s) of computer system 100. In at least one embodiment, cache(s) 113 may include a write-back cache that may keep track of states of lines, such as by using a cache coherence protocol (e.g., MEI, MESI, MSI, etc.). In at least one embodiment, a L3 cache may include 4 MB of memory or more, depending on embodiment, although smaller cache sizes may be used.

In at least one embodiment, computer system 100 may include data store(s) 116 (e.g., memory). In at least one embodiment, data store(s) 116 may be on-chip memory of computer system 100, which may store one or more components of an image or video processing pipeline (e.g., a gaming pipeline), etc. to be executed on the processor 120 of computer system 100. In at least one embodiment, data store(s) 116 may comprise L2 or L3 cache(s).

In at least one embodiment, processor(s) 120 may include embedded processors. In at least one embodiment, processor(s) 120 may include a boot and power management processor that may be a dedicated processor and subsystem to handle boot power and management functions and related security enforcement. In at least one embodiment, a boot and power management processor may be a part of a boot sequence of system 100 and may provide runtime power management services. In at least one embodiment, a boot power and management processor may provide clock and voltage programming, assistance in system low power state transitions, management of system 100 thermals and temperature sensors, and/or management of system 100 power states. In at least one embodiment, each temperature sensor may be implemented as a ring-oscillator whose output frequency is proportional to temperature, and system 100 may use ring-oscillators to detect temperatures of CPU(s), GPU(s), and/or accelerator(s) of system 100.

In at least one embodiment, processor(s) 120 may further include a set of embedded processors that may serve as an audio processing engine which may be an audio subsystem that enables full hardware support for multi-channel audio over multiple interfaces, and a broad and flexible range of audio I/O interfaces. In at least one embodiment, an audio processing engine is a dedicated processor core with a digital signal processor with dedicated RAM.

In at least one embodiment, processor(s) 120 may further include an always-on processor engine that may provide necessary hardware features to support low power sensor management and wake use cases. In at least one embodiment, an always-on processor engine may include, without limitation, a processor core, a tightly coupled RAM, supporting peripherals (e.g., timers and interrupt controllers), various I/O controller peripherals, and routing logic.

In at least one embodiment, processor(s) 120 may further include a safety cluster engine that includes, without limitation, a dedicated processor subsystem to handle safety management for automotive applications. In at least one embodiment, a safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 120 may further include a real-time camera engine that may include, without limitation, a dedicated processor subsystem for handling real-time camera management. In at least one embodiment, processor(s) 120 may further include a signal processor such as a high-dynamic range signal processor that may include, without limitation, an image signal processor. Processor(s) 120 may further interact with a camera or image sensor for receiving and processing received images.

In at least one embodiment, processor(s) 120 may include a video image compositor that may be a processing block (e.g., implemented on a microprocessor) that implements video post-processing functions needed by a video playback application to produce a final image for a player window. In at least one embodiment, a video image compositor may perform lens distortion correction on wide-view camera(s), surround camera(s), and/or on in-cabin monitoring camera sensor(s).

As discussed above, processors 120 such as the GPU in cooperation with the CPU can generate a feed of frames (e.g., output images) for a game or other software to a display device operably coupled to the computer system 100. The GPU in cooperation with the CPU can generate the feed of output images by processing frames of the game through a gaming pipeline or graphics pipeline (e.g., OpenGL or DirectX). As discussed above, a gaming pipeline may include multiple stages (e.g., a simulation thread stage, a render commands generation stage, and a GPU render stage).

In some embodiments, the GPU and the CPU can each include multiple cores, and each core is capable of executing multiple threads. Each core may run multiple threads concurrently (e.g., in parallel). When processing frames in the gaming pipeline, each stage of the plurality of stages of the gaming pipeline can be processed on a thread of the GPU or the CPU.

In some embodiments, the computer system 100 includes a pipeline management component 125 executed by one or more processors 120. The pipeline management component 125 can manage processing of each frame at each stage of the gaming pipeline by scheduling processing of the frames on appropriate threads of the CPU and/or the GPU.

In at least one embodiment, the pipeline management component 125 applies to a stage (e.g., the simulation thread stage) a delay to the execution of a frame in the stage to avoid a bottleneck in a stage preceding the stage with the largest weighted average execution time (e.g., GPU render stage). In at least one embodiment, the pipeline management component 125 uses a proportional-integral-derivative ("PID") controller 122 which can receive feedback from the plurality of stages and dynamically adjust the delay to achieve optimal performance (e.g., by targeting the initial queue time of zero) and to reflect changes to workloads and other runtime conditions. The feedback received by the PID controller 122 may be a queue length indicator represented by a time period between the time when the processing of a first frame at the stage with the largest weighted average execution time and the time when the processing of a second frame (subsequent to the first frame) at the stage preceding the stage with the largest weighted average execution time. The PID controller 122, responsive to receiving the feedback with the queue length indicator, can dynamically adjust the delay to target the time period representing the queue length indicator to be equal to a desired time period (e.g., 0). As such, the PID controller 122 can adjust the delay in response to a changing workload by implementing a control loop mechanism used to calculate a difference between a desired delay and a measured delay and applying a correction based on proportional, integral, and derivative terms.

Figure 2:
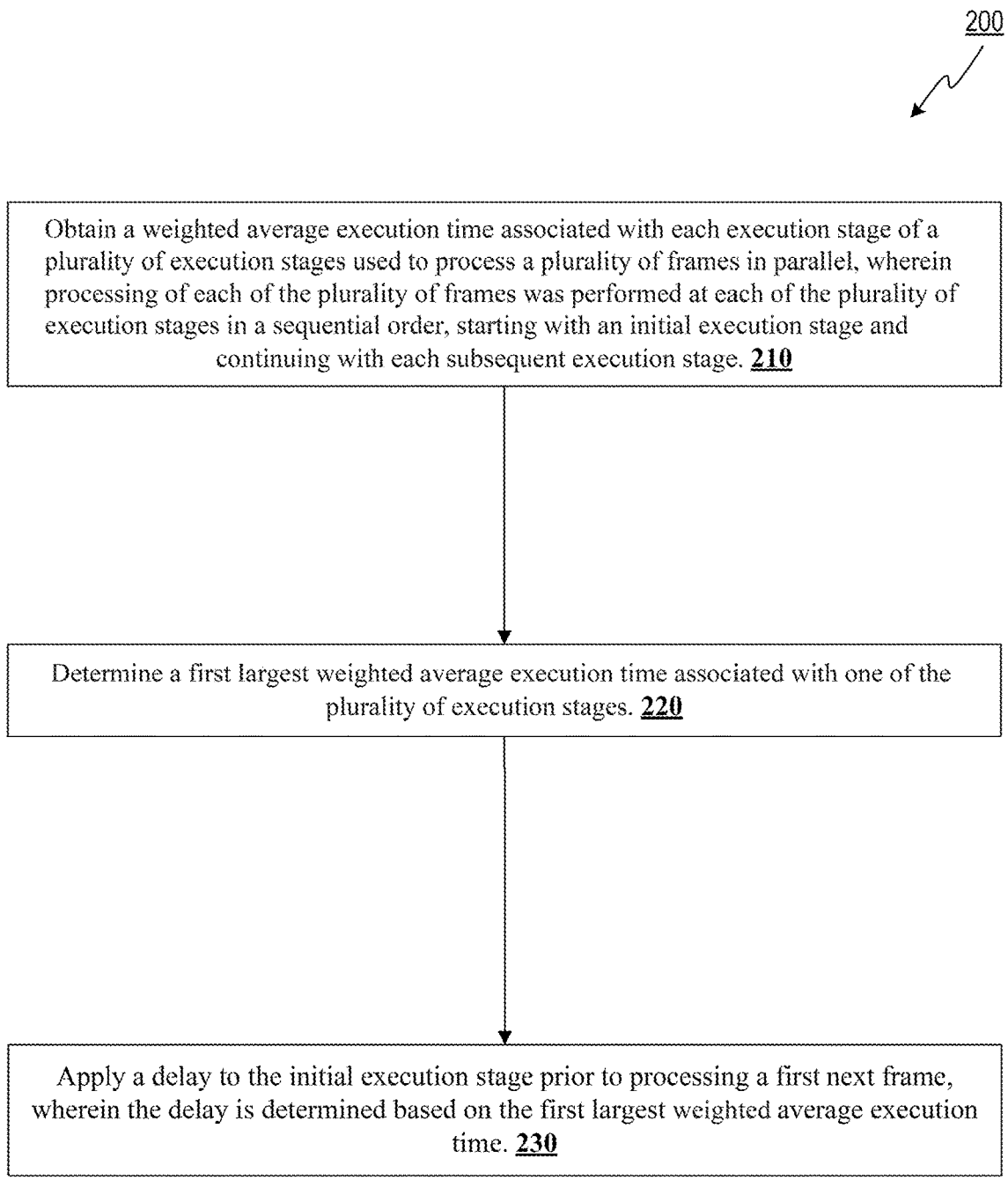
FIG. 2 is a flow diagram of a method of dynamically reducing latency in processing pipelines, in accordance with at least one embodiment.
Figure 3:
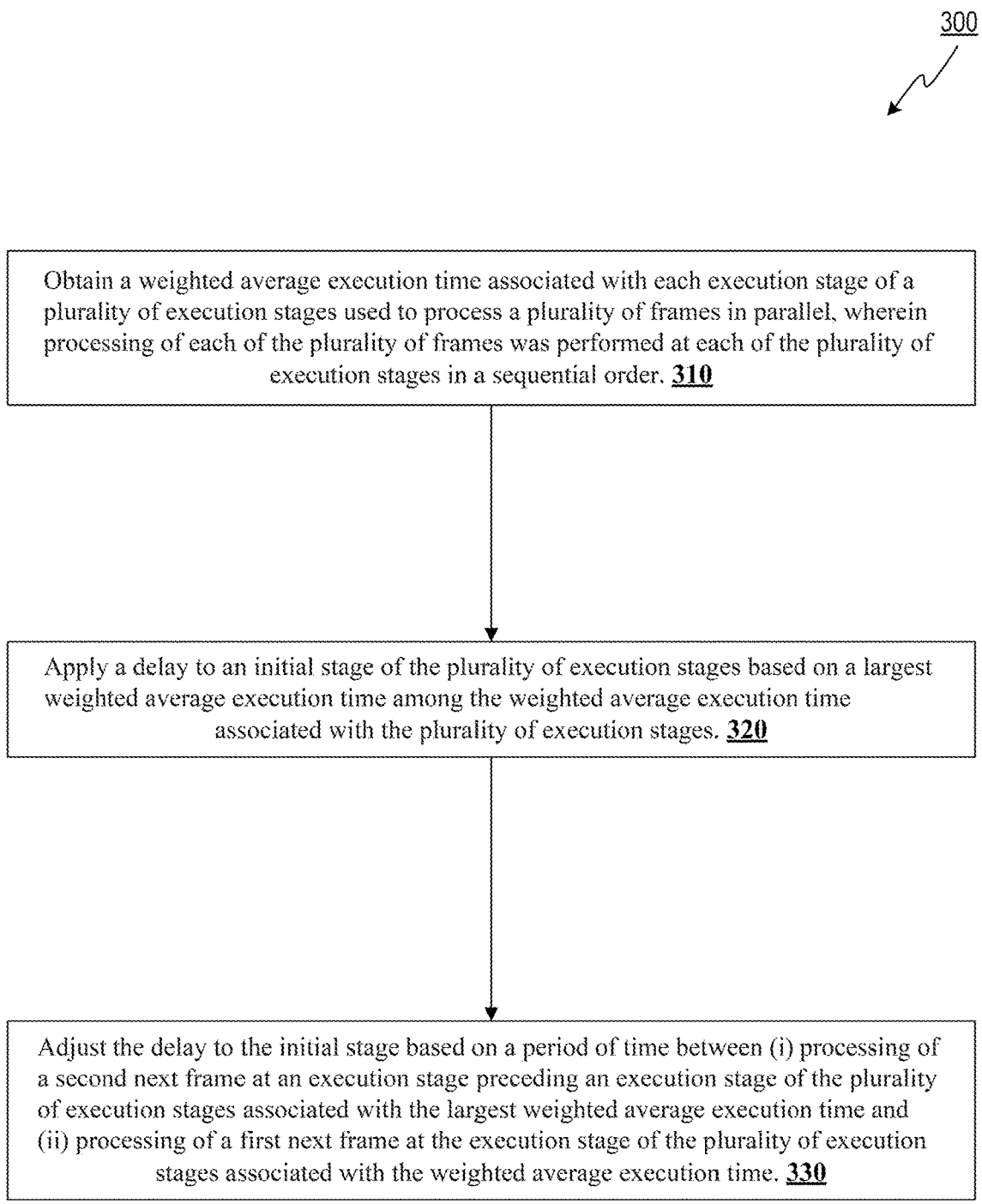
FIG. 3 is a flow diagram of yet another method of dynamically reducing latency in processing pipelines, in accordance with at least one embodiment.

FIG. 2 is a flow diagram of a method 200 of dynamically reducing latency in gaming pipelines, in accordance with at least one embodiment. FIG. 3 is a flow diagram of yet another method 300 of dynamically reducing latency in gaming pipelines, in accordance with at least one embodiment.

Methods 200 and 300 can be performed by processing logic that can include a hardware (e.g., processing device, circuitry, dedicated logic, programmable logic, microcode, hardware of a device, integrated circuit, etc.), software (e.g., instructions run or executed on a processing device), or a combination thereof. In some embodiments, method 200 or 300 is performed by the pipeline management component 125 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operations flows are possible. In some embodiments, different operations can be used. In some embodiments, the same, different, fewer, or more operations can be used.

Referring to FIG. 2, at block 210, the processing logic obtains a weighted average execution time associated with each execution stage of a plurality of execution stages used to process a plurality of frames in parallel. Processing of each of the plurality of frames may be performed at each of the plurality of execution stages in a sequential order (e.g., predefined sequential order), starting with an initial execution stage and continuing with each subsequent execution stage. For example, as described previously, the execution stages may include a simulation thread stage, a render commands generation stage, and a GPU render stage. The weighted average execution time may be determined by applying a weight to the processing time of each frame at the execution stage, adding up a weighted processing time of each frame, and dividing the resulting time by the number of frames processed at the execution stage. The weight may be a value (e.g., a predetermined value between 0 and 1) that indicates relative importance of a particular frame with respect to the other frames processed at the execution stage (e.g., based on the type or order of the particular frame). A processing time of a frame at an execution stage can be obtained based on monitoring performed by a task management component (e.g., a CPU scheduler). As discussed above, in some embodiments, the processing logic obtains a weighted average execution time associated with each execution stage of the plurality of execution stages used to process the plurality of frames in parallel. Alternatively, instead of an average function, any other statistical aggregating function (e.g., median, mean, etc.) can be used for execution time measures in accordance with some embodiments of the present disclosure.

At block 220, the processing logic determines the largest weighted average execution time ("a first largest weighted average execution time") associated with one of the plurality of execution stages. To determine the first largest weighted average execution time associated with one of the plurality of execution stages, the processing logic compares each average execution time of the plurality execution stages with one another to determine which one is the largest.

At block 230, the processing logic applies a delay to the initial execution stage prior to processing next frame X1 ("first next frame"). The delay, at any given time, is equal to a difference between the first largest weighted average execution time and an execution time of a previous frame in the initial execution stage of the plurality of execution stages. For example, the delay may be applied to the simulation thread of the plurality of execution stages. To apply a delay to the initial execution stage, the processing logic causes processing of the first next frame to be suspended for a period of time equal to the delay (e.g., a difference between the first largest weighted average execution time and an execution time of a previous frame in the initial execution stage of the plurality of execution stages).

In some embodiment, the delay may be subsequently adjusted. For example, the processing logic can adjust the delay to be applied to the initial execution stage based on a period of time between (i) processing of next frame X2 ("a second next frame") at an execution stage preceding the execution stage associated with the first largest weighted average execution time and (ii) processing of the first next frame X1 at the execution stage associated with the first largest weighted average execution time. The adjusted delay may be used when processing frames subsequent to next frame X3 ("a third next frame"), for example, next frame X4 ("a fourth next frame), next frame X5 ("a fifth next frame), next frame X6 ("a sixth next frame), or etc. Depending on the embodiment, the last execution stage (e.g., GPU render stage) may be the execution stage with the first largest weighted average execution time.

In some embodiments, to adjust the delay, the processing logic determines whether the period of time between (i) processing of the second next frame X2 at the execution stage preceding the execution stage associated with the first largest weighted average execution time and (ii) processing of the first next frame X1 at the execution stage associated with the first largest weighted average execution time is greater than zero.

Responsive to determining that the period of time is greater than zero, the processing logic increases the delay until the period of time between (i) processing of subsequent frame Y2 ("a second subsequent frame") at the execution stage preceding the execution stage associated with the first largest weighted average execution time and (ii) processing of subsequent frame Y1 ("a first subsequent frame") at the execution stage associated with the first largest weighted average execution time is equal to a predefined minimum value. The predefined minimum value may be zero indicating no delay or queue between processing of the second subsequent frame Y2 at the execution stage preceding the execution stage associated with the first largest weighted average execution time and processing of the first subsequent frame Y1 at the execution stage associated with the first largest weighted average execution time processing.

In some embodiments, to adjust the delay, the processing logic determines whether the period of time (indicating a negative queue) between (i) processing of the second next frame X2 at the execution stage preceding the execution stage associated with the first largest weighted average execution time and (ii) processing of the first next frame X1 at the execution stage associated with the first largest weighted average execution time is less than zero. Depending on the embodiment, the last execution stage (e.g., GPU render stage) may be the execution stage with the first largest weighted average execution time.

Responsive to determining that the period of time is less than zero—indicating a negative queue—the processing logic decreases the delay until the period of time between (i) processing of a second subsequent frame Y2 at the execution stage preceding the execution stage associated with the first largest weighted average execution time and (ii) processing of a first subsequent frame Y1 at the execution stage associated with the first largest weighted average execution time may be equal to a predefined minimum value. The predefined minimum value may be zero indicating no negative queue between processing of the second subsequent frame Y2 at the execution stage preceding the execution stage associated with the first largest weighted average execution time and processing of the first subsequent frame Y1 at the execution stage associated with the first largest weighted average execution time processing.

In some embodiments, to adjust the delay, the processing logic determines whether there is an increase in the period of time between (i) processing of the second next frame X2 at the execution stage preceding the execution stage associated with the first largest weighted average execution time and (ii) processing of the first next frame X1 at the execution stage associated with the first largest weighted average execution time.

Responsive to the period of time increasing, the processing logic increases the delay until the period of time between (i) processing of subsequent frame Y2 ("a second subsequent frame") at the execution stage preceding the execution stage associated with the first largest weighted average execution time and (ii) processing of subsequent frame Y1 ("a first subsequent frame") at the execution stage associated with the first largest weighted average execution time is no longer increasing.

In some embodiments, to adjust the delay, the processing logic determines whether there is a decrease in the period of time between (i) processing of the second next frame X2 at the execution stage preceding the execution stage associated with the first largest weighted average execution time and (ii) processing of the first next frame X1 at the execution stage associated with the first largest weighted average execution time. Depending on the embodiment, the last execution stage (e.g., GPU render stage) may be the execution stage with the first largest weighted average execution time.

Responsive to determining that the period of time is decreasing, the processing logic decreases the delay until the period of time between (i) processing of a second subsequent frame Y2 at the execution stage preceding the execution stage associated with the first largest weighted average execution time and (ii) processing of a first subsequent frame Y1 at the execution stage associated with the first largest weighted average execution time is no longer decreasing.

In some embodiments, a PID controller receives the period of time between processing of the second next frame X2 at the execution stage preceding the execution stage associated with the first largest weighted average execution time and processing of the first next frame X1 at the execution stage associated with the first largest weighted average execution time. Responsive to receiving the period of time by the PID controller as an input, the PID controller provides an adjustment value, as an output, to be applied to the delay based on the period of time matching a predefined minimum value. The processing logic applies the adjustment value to the delay until the period of time between (i) processing of a second subsequent frame at the execution stage preceding the execution stage associated with the first largest weighted average execution time and (ii) processing of a first subsequent frame at the execution stage associated with the first largest weighted average execution time is equal to a predefined minimum value. As described previously, the predefined minimum value may be zero indicating no delay or queue between processing of a second subsequent frame at the execution stage preceding the execution stage associated with the first largest weighted average execution time and processing of a first subsequent frame at the execution stage associated with the first largest weighted average execution time processing.

In some embodiments, a workload may increase or decrease in at least one of the execution stages, resulting in a change of an average execution time at the respective execution stage(s). If such a change occurs while processing the first next frame in at least one execution stage of the plurality of execution stages, the processing logic can update an average execution time of the at least one execution stage of the plurality of execution stages. Based on the updated average execution time, the processing logic can determine a second largest weighted average execution time in view of the updated average execution time of the at least one execution stage. The processing logic can then update the delay to be applied to the initial execution stage based on the second largest weighted average execution time.

In some embodiments, the delay may be based on the determination of the largest weighted average execution time or at least one of the weighted average execution times (e.g., the largest one, not the largest one or any combination of the weighted average execution times). In such embodiments, the delay can be subsequently adjusted as will be discussed in more detail in conjunction with FIGS. 5 and 6.

At block 310, the processing logic obtains a weighted average execution time associated with each execution stage of a plurality of execution stages used to process a plurality of frames in parallel. Processing of each of the plurality of frames may be performed at each of the plurality of execution stages in a sequential order (e.g., predefined sequential order), starting with an initial execution stage and continuing with each subsequent execution stage. For example, as described previously, the execution stages may be simulation thread, render commands generation stage, and GPU render stage. The weighted average execution time may be determined by applying a weight to each of the processing time of each frame at the execution stage, adding up the weighted processing times of the frames, and dividing the resulting time by the number of frames processed at the execution stage. The weight may be a value (e.g., a predetermined value between 0 and 1) that indicates relative importance of a particular frame with respect to the other frames processed at the execution stage (e.g., based on the type or sequence of the particular frame). A processing time of a frame at an execution stage can be obtained based on monitoring performed by a task management component (e.g., a CPU scheduler). As discussed above, in some embodiments, the processing logic obtains a weighted average execution time associated with each execution stage of the plurality of execution stages used to process the plurality of frames in parallel. Alternatively, instead of an average function, any other statistical aggregating function (e.g., median, mean, etc.) can be used for execution time measures in accordance with embodiments of the present disclosure.

At block 320, the processing logic applies a delay to an initial stage of the plurality of execution stages based on at least one average execution time. The delay can be applied prior to processing of next frame X1 ("first next frame"). The delay, at any given time, may be equal to a difference between the largest weighted average execution time among the weighted average execution time associated with the plurality of execution stages and an execution time of a previous frame in the initial stage. To determine the largest weighted average execution time associated with one of the plurality of execution stages, the processing logic compares each average execution time of the plurality execution stages with one another to determine which one is the largest. Alternatively, any other weighted average execution time or any combination of the weighted average execution times (e.g., the sum of the weighted average execution times divided by the number of stages or any other statistical function of the weighted average execution times) may be used in in lieu of the largest weighted average execution time.

At block 330, the processing logic adjusts the delay to the initial stage based on a period of time between (i) processing of a second next frame X2 at an execution stage preceding an execution stage of the plurality of execution stages associated with the largest weighted average execution time and (ii) processing of the first next frame X1 at the execution stage of the plurality of execution stages associated with the largest weighted average execution time.

In some embodiments, to adjust the delay, the processing logic determines whether the period of time between (i) processing of the second next frame at the execution stage preceding the execution stage of the plurality of execution stages associated with the largest weighted average execution time and (ii) processing of the first next frame at the execution stage of the plurality of execution stages associated with the largest weighted average execution time is greater than zero.

Responsive to determining that the period of time is greater than zero, the processing logic increases the delay until the period of time between (i) processing of a second subsequent frame Y2 at the execution stage preceding the execution stage of the plurality of execution stages associated with the largest weighted average execution time and (ii) processing of a first subsequent frame Y1 at the execution stage of the plurality of execution stages associated with the largest weighted average execution time is equal to a predefined minimum value. The predefined minimum value may be zero indicating no delay or queue between processing of the second subsequent frame at the execution stage preceding the execution stage of the plurality of execution stages associated with the largest weighted average execution time and processing of the first subsequent frame at the execution stage of the plurality of execution stages associated with the largest weighted average execution time.

In some embodiments, to adjust the delay, the processing logic determines whether the period of time between (i) processing of the second next frame X2 at the execution stage preceding the execution stage of the plurality of execution stages associated with the largest weighted average execution time and (ii) processing of the first next frame X1 at the execution stage of the plurality of execution stages associated with the largest weighted average execution time is less than zero.

Responsive to determining that the period of time is less than zero, the processing logic decreases the delay until the period of time between (i) processing of a second subsequent frame Y2 at the execution stage preceding the execution stage of the plurality of execution stages associated with the largest weighted average execution time and (ii) processing of a first subsequent frame Y1 at the execution stage of the plurality of execution stages associated with the largest weighted average execution time may be equal to a predefined minimum value. The predefined minimum value may be zero indicating no delay or queue between processing of a second subsequent frame at the execution stage preceding the execution stage associated with the first largest weighted average execution time and processing of a first subsequent frame at the execution stage associated with the first largest weighted average execution time processing.

Figure 4:
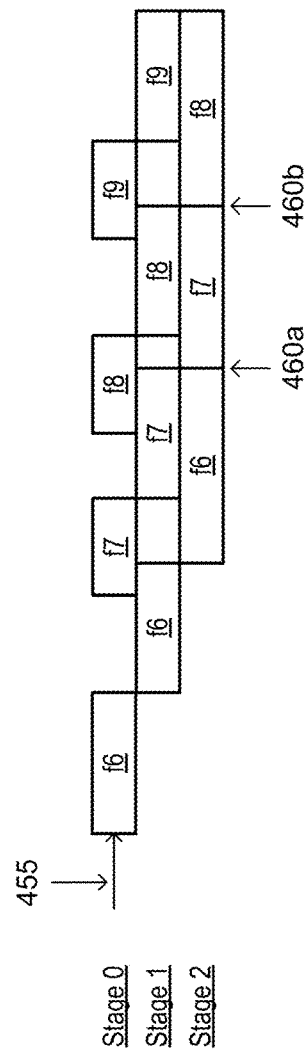
FIG. 4 illustrates an example of a delay applied to a stage of a processing pipeline to reduce latency in the processing pipeline, in accordance with at least one embodiment.

FIG. 4 is an example of a delay applied to an initial stage of a gaming pipeline to reduce latency in the gaming pipeline, according to at least one embodiment. Gaming pipeline 400 includes a plurality of stages (e.g., stage 0, stage 1, and stage 2) each processing a frame of a plurality of frames.

The gaming pipeline 400 at an initial state 410 includes a plurality of frames (e.g., f1-f3) being processed in each stage of the plurality of stages (e.g., stage 0, stage 1, and stage 2). During execution of the plurality of frames in the gaming pipeline 400, the pipeline management component 125 for each stage of the plurality of stages obtains a weighted average execution time of the plurality of frames (e.g., f1-f3) in the stage. The weighted average execution time of the plurality of frames in the stage may be determined by obtaining a sum of the weighted execution times of each frame in the stage (e.g., execution time of f1-f5 in stage 0) and dividing the sum of the execution times of each frame in the stage by the number of frames executed (e.g., 5). Once the weighted average execution time is determined, the pipeline management component 125 determines the stage with the largest weighted average execution time (e.g., stage 2) and applies a delay 455 equal to a difference between the largest execution time and an execution time of frame f5 at first stage of the plurality of stages (e.g., stage 0) to the first stage of the plurality of stages (e.g., stage 0) prior to execution of frame f6 at stage 0. In some embodiments, delay 455 may be applied to a stage preceding the stage with the largest weighted average execution time (e.g., stage 1).

Accordingly, at a second state 450, prior to execution of each frame of subsequent frames (e.g., f6-f9), the pipeline management component 125 can apply delay 455 to pace the execution of the subsequent frames (f6-f9) in the other stages of the plurality of stages (e.g., stage 1 and stage 2), thereby eliminating a period of time (e.g., 460a and 460b) between execution of a frame (e.g., f7 and f8, respectively) in the stage preceding the stage with the largest weighted average execution time (e.g., stage 1) and execution of the frame (e.g., f6 and f7) in the stage with the largest execution time (e.g., stage 2).

Figure 5:
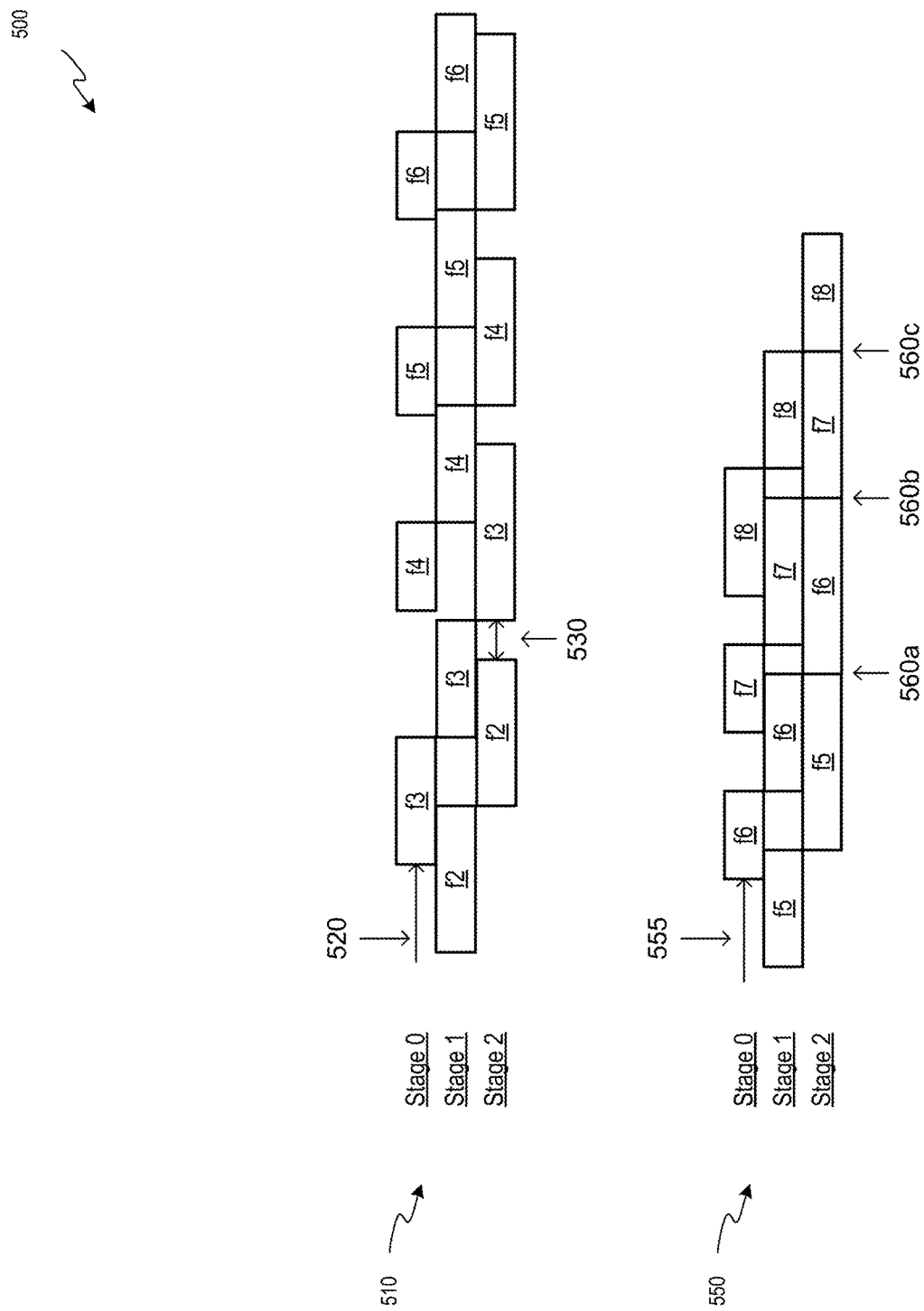
FIG. 5 illustrates an example of dynamically adjusting a delay applied to a stage of a processing pipeline to reduce latency in the processing pipeline, in accordance with at least one embodiment.

FIG. 5 is an example of dynamically adjusting the delay applied to the initial stage of the gaming pipeline to reduce latency in the gaming pipeline, according to at least one embodiment. Gaming pipeline 500 includes a plurality of stages (e.g., stage 0, stage 1, and stage 2) each processing a frame of a plurality of frames with a delay applied to stage 0 of gaming pipeline 500.

The gaming pipeline 500 at an initial state 510 includes a delay 520 (e.g., equal to a difference between the largest weighted average execution time and a previous frame at the first stage of the plurality of stages (e.g., stage 0)) to the first stage of the plurality of stages (e.g., stage 0), obtained in a previous state (e.g., initial state 510 of gaming pipeline 500 of FIG. 5). In some instances, the period of time (e.g., 530) between execution of a frame (e.g., f3) in the stage preceding the stage with the largest weighted average execution time (e.g., stage 1) and execution of the frame (e.g., f2) in the stage with the largest execution time (e.g., stage 2) may be less than a predefined minimum value (e.g., 0).

Accordingly, at a second state 550, prior to execution of each frame of subsequent frames (e.g., f6-f9), the pipeline management component 125 provides the period of time (e.g., 530) to PID controller 122 (FIG. 1) to facilitate adjustments to the delay 520, to reduce the period of time 530 to the predefined minimum, to generate an adjusted delay 555. Further, prior to execution of each frame of subsequent frames (e.g., f6-f9), the pipeline management component 125 will apply the adjusted delay 555 to pace the execution of the subsequent frames (f6-f8) in the other stages of the plurality of stages (e.g., stage 1 and stage 2), thereby eliminating a period of time (e.g., 560a-c) between execution of a frame (e.g., f6, f7, and f8, respectively) in the stage preceding the stage with the largest weighted average execution time (e.g., stage 1) and execution of the frame (e.g., f5, f6, and f7) in the stage with the largest execution time (e.g., stage 2).

In some embodiments, applying the adjusted delay to pace execution of the subsequent frames (f6-f9) in the other stages of the plurality of stages (e.g., stage 1 and stage 2) does not immediately eliminate the period of time (e.g., 560a-c), therefore, the pipeline management component 125 continues to provide the PID controller 122 with the period of time between execution of a frame in the stage preceding the stage with the largest weighted average execution time (e.g., stage 1) and execution of a previous frame in the stage with the largest execution time until the period of time is no longer greater than the predefined minimum value (e.g., 0).

Figure 6:
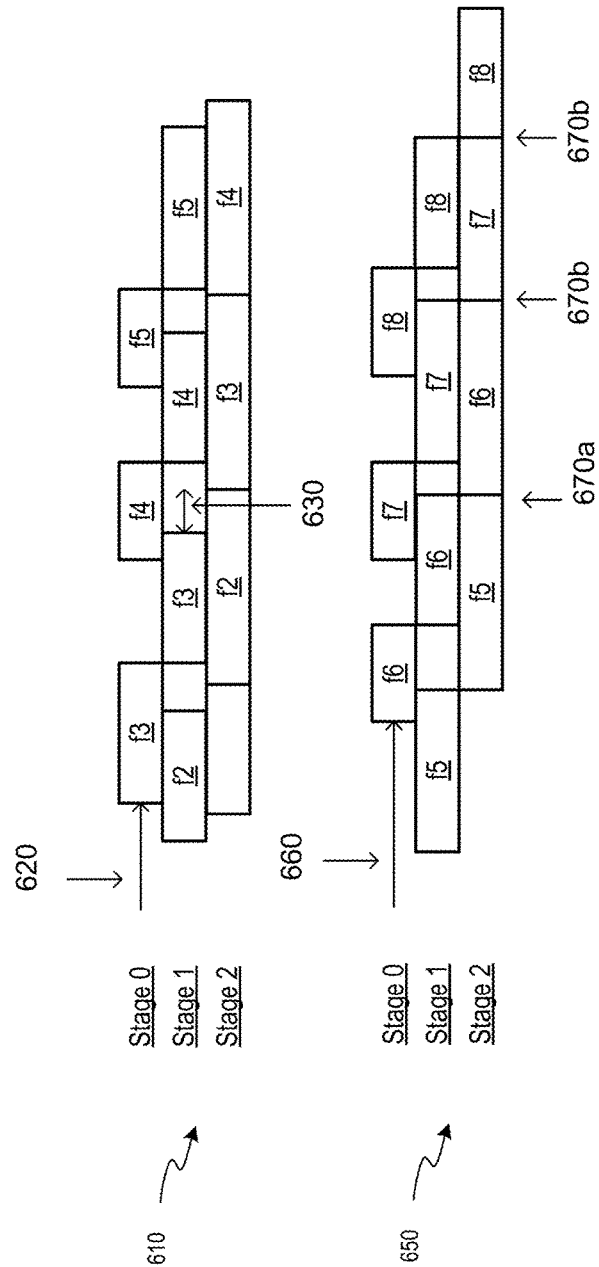
FIG. 6 illustrates is yet another example of dynamically adjusting a delay applied to a stage of a processing pipeline to reduce latency in the processing pipeline, in accordance with at least one embodiment.

FIG. 6 is yet another example of dynamically adjusting the delay applied to the initial stage of the gaming pipeline to reduce latency in the gaming pipeline, according to at least one embodiment. Gaming pipeline 600 includes a plurality of stages (e.g., stage 0, stage 1, and stage 2) each processing a frame of a plurality of frames with a delay applied to stage 0 of gaming pipeline 600.

The gaming pipeline 600 at an initial state 610 includes a delay 620 based on the largest weighted average execution time (e.g., stage 2) to the first stage of the plurality of stages (e.g., stage 0), obtained in a previous state (e.g. initial state 510 of gaming pipeline 500 of FIG. 5). In some instances, the period of time (e.g., 630) between execution of a frame (e.g., f3) in the stage preceding the stage with the largest weighted average execution time (e.g., stage 1) and execution of the frame (e.g., f2) in the stage with the largest execution time (e.g., stage 2) may be greater than a predefined minimum value (e.g., 0).

Accordingly, at a second state 650, prior to execution of each frame of subsequent frames (e.g., f6-f9), the pipeline management component 125 provides the period of time (e.g., 630) to PID controller 122 (FIG. 1) to facilitate adjustments to the delay 620, to reduce the period of time 630 to the predefined minimum value, to generate an adjusted delay 660. Further, prior to execution of each frame of subsequent frames (e.g., f6-f9), the pipeline management component 125 will apply the adjusted delay 660 to pace the execution of the subsequent frames (f6-f9) in the other stages of the plurality of stages (e.g., stage 1 and stage 2), thereby eliminating a period of time (e.g., 670a-cb) between execution of a frame (e.g., f6, f7, and f8, respectively) in the stage preceding the stage with the largest weighted average execution time (e.g., stage 1) and execution of the frame (e.g., f5, f6, and f7, respectively) in the stage with the largest execution time (e.g., stage 2).

In some embodiments, applying the adjusted delay to pace execution of the subsequent frames (f6-f9) in the other stages of the plurality of stages (e.g., stage 1 and stage 2) does not immediately eliminate the period of time (e.g., 670a and b), and therefore, the pipeline management component 125 continues to provide the PID controller 122 with the period of time between execution of a frame in the stage preceding the stage with the largest weighted average execution time (e.g., stage 1) and execution of a previous frame in the stage with the largest execution time until the period of time is no longer less than the predefined minimum value (e.g., 0).

Figure 7:
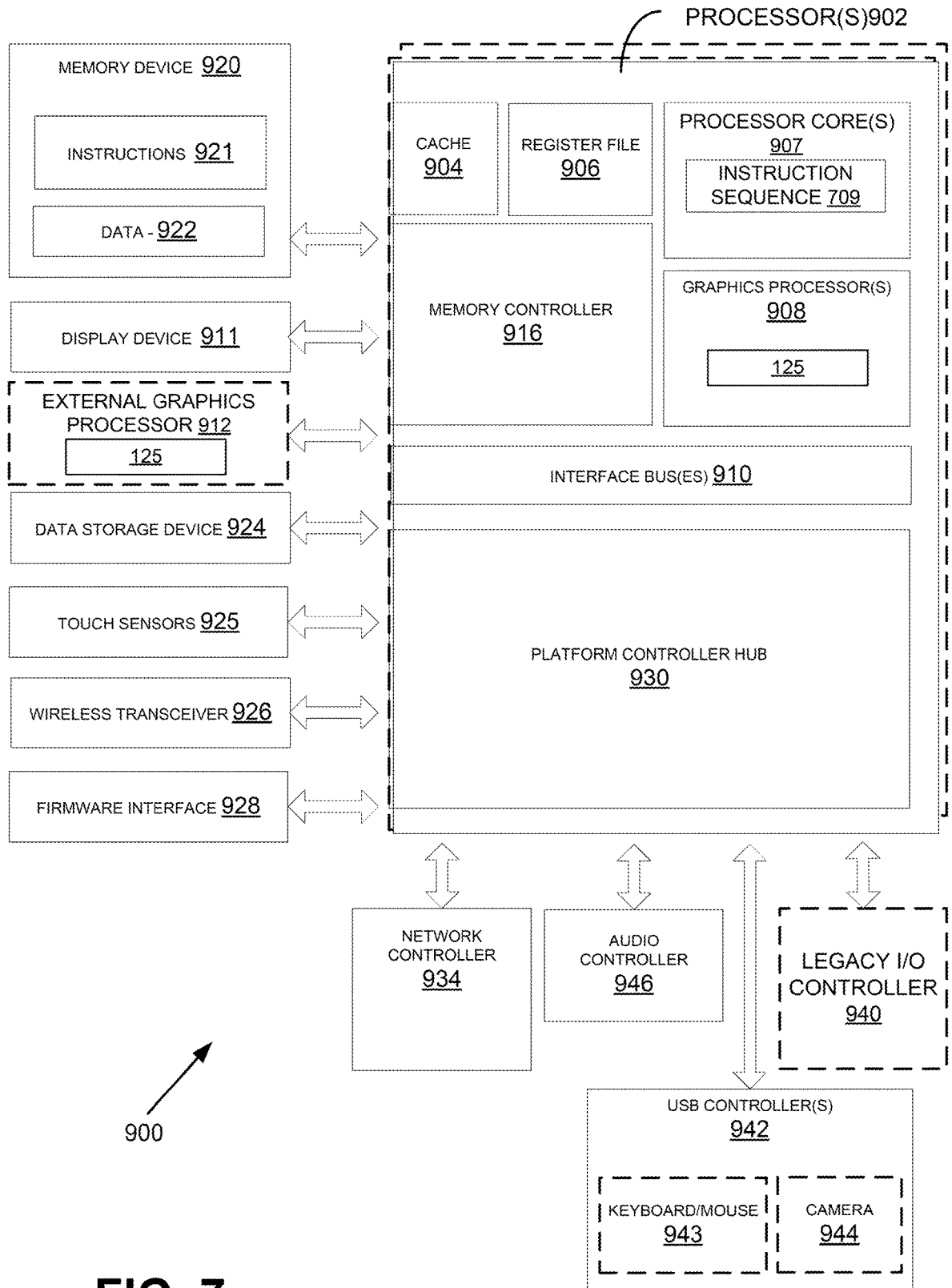
FIG. 7 is a block diagram illustrating a computer system, according to at least one embodiment.

FIG. 7 is a block diagram of a processing system, according to at least one embodiment. In at least one embodiment, system 900 includes one or more processors 902 including one or more graphics processors 908, and may be a single processor desktop system, a multiprocessor workstation system, or a server system having a large number of processors 902 or processor cores 907. In at least one embodiment, system 900 is a processing platform incorporated within a system-on-a-chip (SoC) integrated circuit for use in mobile, handheld, or embedded devices.

In at least one embodiment, system 900 can include, or be incorporated within a server-based gaming platform, a game console, including a game and media console, a mobile gaming console, a handheld game console, or an online game console. In at least one embodiment, system 900 is a mobile phone, a smart phone, a tablet computing device or a mobile Internet device. In at least one embodiment, processing system 900 can also include, couple with, or be integrated within a wearable device, such as a smart watch wearable device, a smart eyewear device, an augmented reality device, or a virtual reality device. In at least one embodiment, processing system 900 is a television or set top box device having one or more processors 902 and a graphical interface generated by one or more graphics processors 908.

In at least one embodiment, one or more processors 902 each include one or more processor cores 907 to process instructions which, when executed, perform operations for system and user software. In at least one embodiment, each of one or more processor cores 907 is configured to process a specific instruction sequence 909. In at least one embodiment, instruction sequence 909 may facilitate Complex Instruction Set Computing (CISC), Reduced Instruction Set Computing (RISC), or computing via a Very Long Instruction Word (VLIW). In at least one embodiment, processor cores 907 may each process a different instruction sequence 909, which may include instructions to facilitate emulation of other instruction sequences. In at least one embodiment, processor core 907 may also include other processing devices, such a Digital Signal Processor (DSP).

In at least one embodiment, processor 902 includes a cache memory 904. In at least one embodiment, processor 902 can have a single internal cache or multiple levels of internal cache. In at least one embodiment, cache memory is shared among various components of processor 902. In at least one embodiment, processor 902 also uses an external cache (e.g., a Level-3 (L3) cache or Last Level Cache (LLC)) (not shown), which may be shared among processor cores 907 using known cache coherency techniques. In at least one embodiment, a register file 906 is additionally included in processor 902, which may include different types of registers for storing different types of data (e.g., integer registers, floating point registers, status registers, and an instruction pointer register). In at least one embodiment, register file 906 may include general-purpose registers or other registers.

In at least one embodiment, one or more processor(s) 902 are coupled with one or more interface bus(es) 910 to transmit communication signals such as address, data, or control signals between processor 902 and other components in system 900. In at least one embodiment, interface bus 910 can be a processor bus, such as a version of a Direct Media Interface (DMI) bus. In at least one embodiment, interface bus 910 is not limited to a DMI bus, and may include one or more Peripheral Component Interconnect buses (e.g., PCI, PCI Express), memory busses, or other types of interface busses. In at least one embodiment processor(s) 902 include an integrated memory controller 916 and a platform controller hub 930. In at least one embodiment, memory controller 916 facilitates communication between a memory device and other components of system 900, while platform controller hub (PCH) 930 provides connections to I/O devices via a local I/O bus.

In at least one embodiment, a memory device 920 can be a dynamic random access memory (DRAM) device, a static random access memory (SRAM) device, flash memory device, phase-change memory device, or some other memory device having suitable performance to serve as process memory. In at least one embodiment, memory device 920 can operate as system memory for system 900, to store data 922 and instructions 921 for use when one or more processors 902 executes an application or process. In at least one embodiment, memory controller 916 also couples with an optional external graphics processor 912, which may communicate with one or more graphics processors 908 in processors 902 to perform graphics and media operations. In at least one embodiment, a display device 911 can connect to processor(s) 902. In at least one embodiment, display device 911 can include one or more of an internal display device, as in a mobile electronic device or a laptop device, or an external display device attached via a display interface (e.g., DisplayPort, etc.). In at least one embodiment, display device 911 can include a head mounted display (HMD) such as a stereoscopic display device for use in virtual reality (VR) applications or augmented reality (AR) applications.

In at least one embodiment, platform controller hub 930 enables peripherals to connect to memory device 920 and processor 902 via a high-speed I/O bus. In at least one embodiment, I/O peripherals include, but are not limited to, an audio controller 946, a network controller 934, a firmware interface 928, a wireless transceiver 926, touch sensors 925, a data storage device 924 (e.g., hard disk drive, flash memory, etc.). In at least one embodiment, data storage device 924 can connect via a storage interface (e.g., SATA) or via a peripheral bus, such as a Peripheral Component Interconnect bus (e.g., PCI, PCI Express). In at least one embodiment, touch sensors 925 can include touch screen sensors, pressure sensors, or fingerprint sensors. In at least one embodiment, wireless transceiver 926 can be a Wi-Fi transceiver, a Bluetooth transceiver, or a mobile network transceiver such as a 3G, 4G, or Long Term Evolution (LTE) transceiver. In at least one embodiment, firmware interface 928 enables communication with system firmware, and can be, for example, a unified extensible firmware interface (UEFI). In at least one embodiment, network controller 934 can enable a network connection to a wired network. In at least one embodiment, a high-performance network controller (not shown) couples with interface bus 910. In at least one embodiment, audio controller 946 is a multi-channel high definition audio controller. In at least one embodiment, system 900 includes an optional legacy I/O controller 940 for coupling legacy (e.g., Personal System 2 (PS/2)) devices to system 900. In at least one embodiment, platform controller hub 930 can also connect to one or more Universal Serial Bus (USB) controllers 942 connect input devices, such as keyboard and mouse 943 combinations, a camera 944, or other USB input devices.

In at least one embodiment, an instance of memory controller 916 and platform controller hub 930 may be integrated into a discreet external graphics processor, such as external graphics processor 912. In at least one embodiment, platform controller hub 930 and/or memory controller 916 may be external to one or more processor(s) 902. For example, in at least one embodiment, system 900 can include an external memory controller 916 and platform controller hub 930, which may be configured as a memory controller hub and peripheral controller hub within a system chipset that is in communication with processor(s) 902.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
obtaining a weighted average execution time associated with each execution stage of a plurality of execution stages processing a plurality of frames starting with an initial execution stage and continuing with each subsequent execution stage;
determining a first largest weighted average execution time associated with one of the plurality of execution stages; and
applying a delay to the initial execution stage prior to processing a first next frame of the plurality of frames, wherein the delay is based on the first largest weighted average execution time of the plurality of execution stages.

2. The method of claim 1, further comprising:
updating, upon processing the first next frame in at least one execution stage of the plurality of execution stages, a weighted average execution time of the at least one execution stage of the plurality of execution stages;
determining a second largest weighted average execution time in view of the updated weighted average execution time of the at least one execution stage; and
updating the delay to be applied to the initial execution stage based on the second largest weighted average execution time.

3. The method of claim 1, wherein the delay is equal to a difference between the first largest weighted average execution time and an execution time of a previous frame in the initial execution stage of the plurality of execution stages.

4. The method of claim 1, further comprising:
adjusting, prior to processing subsequent frames, the delay to be applied to the initial execution stage based on a period of time between (i) processing of a second next frame at an execution stage preceding an execution stage associated with the first largest weighted average execution time and (ii) processing of the first next frame at the execution stage associated with the first largest weighted average execution time.

5. The method of claim 4, wherein adjusting the delay comprises:
determining that the period of time between (i) processing of the second next frame at the execution stage preceding the execution stage associated with the first largest weighted average execution time and (ii) processing of the first next frame at the execution stage associated with the first largest weighted average execution time is greater than zero; and
increasing the delay until the period of time between (i) processing of a second subsequent frame at the execution stage preceding the execution stage associated with the first largest weighted average execution time and (ii) processing of a first subsequent frame at the execution stage associated with the first largest weighted average execution time is equal to a predefined minimum value.

6. The method of claim 4, wherein adjusting the delay comprises:
determining that the period of time between (i) processing of the second next frame at the execution stage preceding the execution stage associated with the first largest weighted average execution time and (ii) processing of the first next frame at the execution stage associated with the first largest weighted average execution time is less than zero; and
decreasing the delay until the period of time between (i) processing of a second subsequent frame at the execution stage preceding the execution stage associated with the first largest weighted average execution time and (ii) processing of a first subsequent frame at the execution stage associated with the first largest weighted average execution time is equal to a predefined minimum value.

7. The method of claim 6, wherein the predefined minimum value indicates there is no delay or queue between processing of the second subsequent frame at the execution stage preceding the execution stage associated with the first largest weighted average execution time and processing of the first subsequent frame at the execution stage associated with the first largest weighted average execution time processing.

8. The method of claim 4, wherein adjusting the delay comprises:
receiving, using a proportional-integral-derivative (PID) controller, the period of time between processing of the second next frame at the execution stage preceding the execution stage associated with the first largest weighted average execution time and processing of the first next frame at the execution stage associated with the first largest weighted average execution time; and
outputting, using the PID controller, an adjustment value to be applied to the delay based on the period of time matching a predefined minimum value; and
applying the adjustment value to the delay.

9. A system comprising:
one or more processing units to:
obtaining a weighted average execution time associated with each execution stage of a plurality of execution stages processing a plurality of frames starting with an initial execution stage and continuing with each subsequent execution stage;
determining a first largest weighted average execution time associated with one of the plurality of execution stages; and
applying a delay to the initial execution stage prior to processing a first next frame of the plurality of frames, wherein the delay is based on the first largest weighted average execution time of the plurality of execution stages.

10. The system of claim 9, wherein the one or more processing units further:
update, upon processing the first next frame in at least one execution stage of the plurality of execution stages, a weighted average execution time of the at least one execution stage of the plurality of execution stages;
determine a second largest weighted average execution time in view of the updated weighted average execution time of the at least one execution stage; and
update the delay to be applied to the initial execution stage based on the second largest weighted average execution time.

11. The system of claim 9, wherein the delay is equal to a difference between the first largest weighted average execution time and an execution time of a previous frame in the initial executions stage of the plurality of execution stages.

12. The system of claim 9, wherein the one or more processing units further:
adjust, prior to processing subsequent frames, the delay to be applied to the initial execution stage based on a period of time between (i) processing of a second next frame at an execution stage preceding an execution stage associated with the first largest weighted average execution time and (ii) processing of the first next frame at the execution stage associated with the first largest weighted average execution time.

13. The system of claim 12, wherein to adjust the delay, the one or more processing units further:
determine that the period of time between (i) processing of the second next frame at the execution stage preceding the execution stage associated with the first largest weighted average execution time and (ii) processing of the first next frame at the execution stage associated with the first largest weighted average execution time is greater than zero; and
increase the delay until the period of time between (i) processing of a second subsequent frame at the execution stage preceding the execution stage associated with the first largest weighted average execution time and (ii) processing of a first subsequent frame at the execution stage associated with the first largest weighted average execution time is equal to a predefined minimum value.

14. The system of claim 12, wherein to adjust the delay, the one or more processing units further:
determine that the period of time between (i) processing of the second next frame at the execution stage preceding the execution stage of the plurality of execution stages associated with the largest weighted average execution time and (ii) processing of the first next frame at the execution stage of the plurality of execution stages associated with the largest weighted average execution time is less than zero; and
decrease the delay until the period of time between (i) processing of a second subsequent frame at the execution stage preceding the execution stage associated with the first largest weighted average execution time and (ii) processing of a first subsequent frame at the execution stage associated with the first largest weighted average execution time is equal to a predefined minimum value.

15. The system of claim 14, wherein the predefined minimum value indicates that there is no delay or queue between processing of a second subsequent frame at the execution stage preceding the execution stage associated with the first largest weighted average execution time and processing of a first subsequent frame at the execution stage associated with the first largest weighted average execution time processing.

16. The system of claim 15, wherein to adjust the delay, the one or more processing units further:
receive, using a proportional-integral-derivative PID controller, the period of time between processing of the second next frame at the execution stage preceding the execution stage associated with the first largest weighted average execution time and processing of the first next frame at the execution stage associated with the first largest weighted average execution time; and
output, using the PID controller, an adjustment value to be applied to the delay based on the period of time matching a predefined minimum value, and applying the adjustment value to the delay.

17. A non-transitory computer-readable storage medium comprising instructions that, when executed by a processing device, cause the processing device to perform operations comprising:
obtaining a weighted average execution time associated with each execution stage of a plurality of execution stages processing a plurality of frames;
applying a delay to an initial stage of the plurality of execution stages based on a largest weighted average execution time associated with one of the plurality of execution stages; and adjusting the delay to the initial stage based on a period of time between processing in sequentially adjacent execution stages.

18. The non-transitory computer-readable storage medium of claim 17, wherein the delay is equal to a difference between the largest weighted average execution time among the weighted average execution times associated with the plurality of execution stages and an execution time of a previous frame in the initial stage.

19. The non-transitory computer-readable storage medium of claim 17, wherein adjusting the delay comprises:
  determining that the period of time is a first period of time between (i) processing of a second next frame at the execution stage preceding the execution stage of the plurality of execution stages associated with the largest weighted average execution time and (ii) processing of a first next frame at the execution stage of the plurality of execution stages associated with the largest weighted average execution time is greater than zero;
  providing, to a proportional-integral-derivative (PID) controller, the first period of time to increase the delay until a second period between (i) processing of a second subsequent frame at the execution stage preceding the execution stage of the plurality of execution stages associated with the largest weighted average execution time and (ii) processing of a first subsequent frame at the execution stage of the plurality of execution stages associated with the largest weighted average execution time is equal to a predefined minimum value.

20. The non-transitory computer-readable storage medium of claim 17, wherein adjusting the delay comprises:
  determining that the period of time is a first period of time between (i) processing of a second next frame at the execution stage preceding the execution stage of the plurality of execution stages associated with the largest weighted average execution time and (ii) processing of a first next frame at the execution stage of the plurality of execution stages associated with the largest weighted average execution time is less than zero;
  providing, to a proportional-integral-derivative (PID) controller, the period of time to decrease the delay until a second period of time between (i) processing of a second subsequent frame at the execution stage preceding the execution stage of the plurality of execution stages associated with the largest weighted average execution time and (ii) processing of a first subsequent frame at the execution stage of the plurality of execution stages associated with the largest weighted average execution time is equal to a predefined minimum value.

* * * * *